D. W. HUGHES.
PLOW ATTACHMENT.
No. 186,344. Patented Jan. 16, 1877.
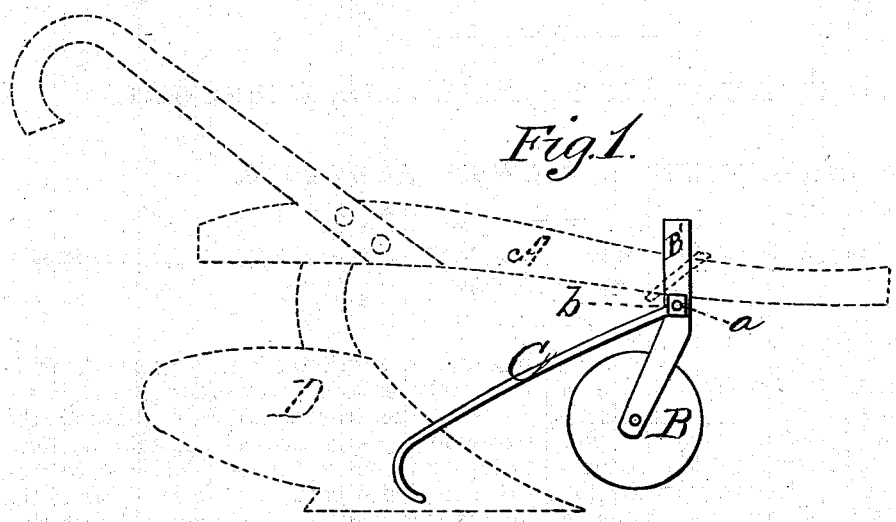
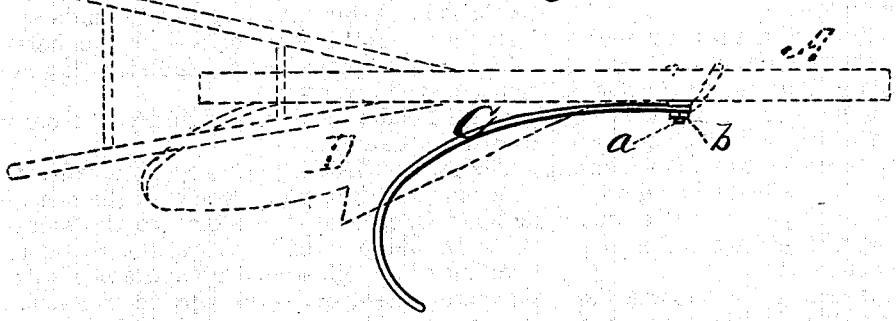
WITNESSES
INVENTOR
D. W. Hughes.
Gilmore & Co.
ATTORNEYS.

UNITED STATES PATENT OFFICE.

DAVID W. HUGHES, OF ST. LOUIS, MISSOURI.

IMPROVEMENT IN PLOW ATTACHMENTS.

Specification forming part of Letters Patent No. 186,344, dated January 16, 1877; application filed January 15, 1876.

*To all whom it may concern:*

Be it known that I, DAVID W. HUGHES, of the city of St. Louis, in the county of St. Louis and State of Missouri, have invented a new and valuable Improvement in Plow Attachments; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side view of my plow attachment, and Fig. 2 is a plan view thereof.

This invention has relation to improvements in attachments for plows.

The object of the invention is to devise a ready and effective means for holding weeds, grass, and other like growths designed to be plowed under, until they are covered by the earth upturned by a plow.

To this end the nature of the invention consists in a hook attached to the colter-standard of a plow-beam, and conforming to the shape of the mold-board, the end of which is designed to run in the furrow last made, and, being curved downward and extending across the length of the furrow, will thus hold down the growth desired to be plowed under until they are covered, as will be hereinafter more fully explained and claimed.

In the annexed drawings, the letter A designates an ordinary plow, in connection with which I propose to illustrate my invention. I will, however, premise that my invention is equally applicable to any of the descriptions of plows known to the trade. The beam of this plow is provided with the usual well-known wheel-colter B, which precedes the plow-point, and is in the same vertical plane therewith. C represents a vertically-vibrating metallic hook, which is secured to the shank B' of the wheel-colter by means of a bolt, *a*, and a suitable nut, *b*. This hook is preferably made of wrought-iron, and it extends to the rear considerably beyond the plow-point. It is also bent so as to conform to the curvature of the mold-board D, its free extremity being bent down so as to run in the furrow last made, and its general direction being obliquely across the furrow.

When the plow is at work, this hook will press down the weeds, grass, or other growth designed to be turned under as it proceeds, and will hold them down, so that the earth turned over will bury them in the ground, and thus secure their speedy decay.

This hook being vertically vibratory, it may be adjusted so as to suit grass or weeds of different heights, and it is, consequently, adapted to be profitably used with any growth of the same.

I am aware that a bent bar having cutters attached thereto, and terminating in an arm, the bent bar being attached to and made adjustable upon the beam of a plow, has heretofore been employed, and I therefore lay no claim to such invention.

What I claim as new, and desire to secure by Letters Patent, is—

The colter-wheel B, journaled in the adjustable shank B', in combination with the metallic hook C, curved to conform to the mold-board D, and pivoted to the shank B', so as to admit of an adjustment up and down with the colter-wheel, and also capable of a separate circular adjustment in a vertical plane on the bolt *a*, substantially as described, and for the purpose set forth.

In testimony that I claim the above I have hereunto subscribed my name in the presence of two witnesses.

DAVID W. HUGHES.

Witnesses:
GEO. O. ATHERTON,
ALEX. HEBURN.